6431X
W. LAWRENCE.
Lamp.
Patented Mar. 23, 1831.
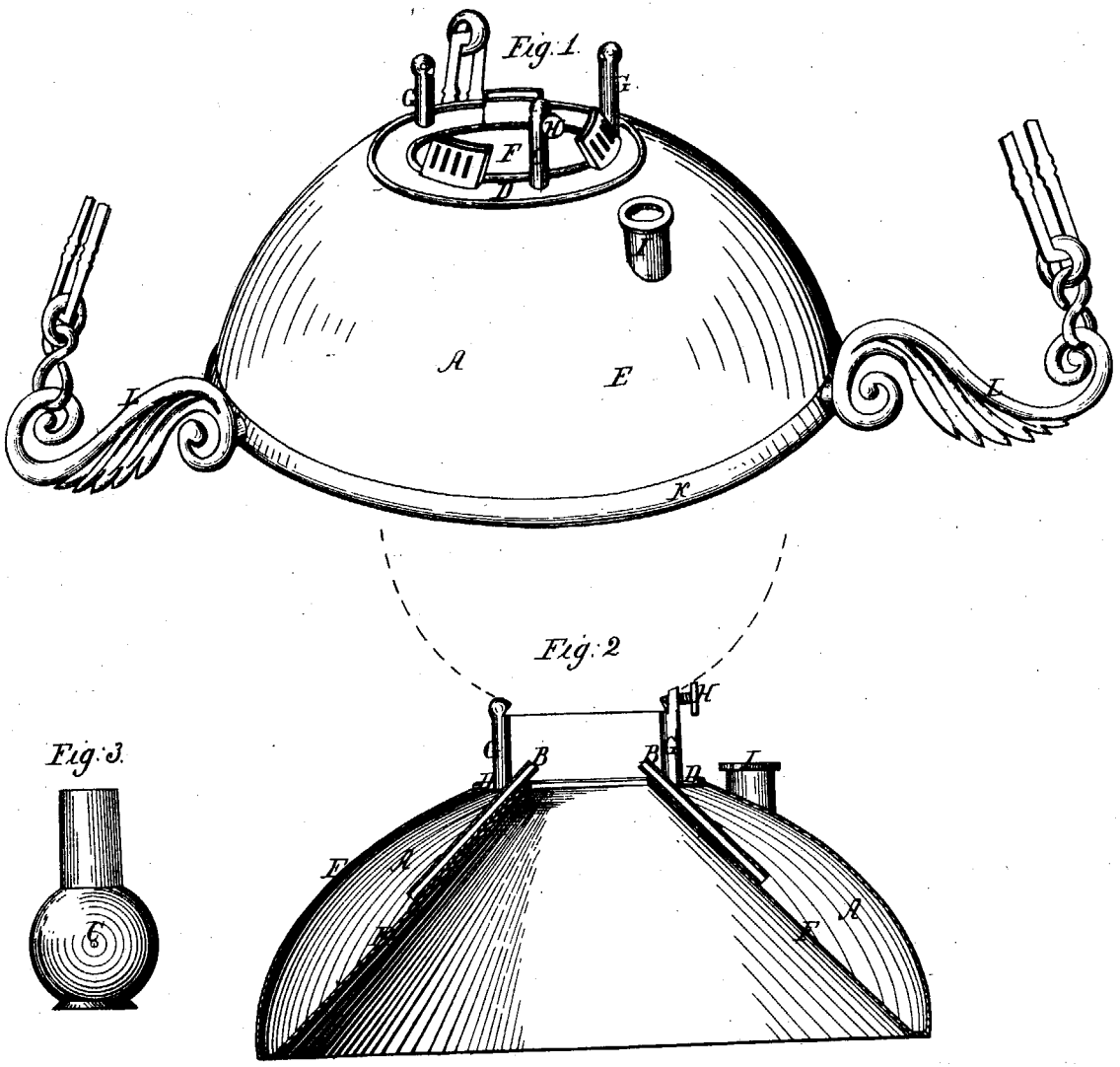
THE NORRIS PETERS CO., PHOTO-LITHO., WASHINGTON, D. C.

Mar 23. 1831

6431x William Lawrence . New Haven in Connecticut

Letters Patent ( Patented March 23. 1831. Reissued March 10th 1834. )

The Schedule referred to in these Letters Patent and making part of the same, containing a description in the words of the said William Lawrence himself of his improvement in the Chandelier or hanging Lamp. for which Letters Patent were granted dated the 23d day of March 1831. ) which Letters Patent being hereby cancelled on account of a defective Specification To all to whom these presents shall come. Be it known that I William Lawrence of Meriden in the County of New Haven and State of Connecticut have invented a new and useful improvement in the Chandelier or hanging Lamp that on the twenty third day of March in the year of our Lord One thousand eight hundred and thirty one. and of the Independence of the United States of America the fifty fifth I obtained Letters Patent of the said United States in due form for said invention or improvement. signed by Andrew Jackson President of the United States. and with the seal of the United States thereto affixed. And finding the specification of the said invention or improvement. made by me and annexed to said Letters Patent to be defective and inaccurate. I have surrendered the said Letters Patent and caused the same to be cancelled in the department of State of the United States. and now for the purpose of obtaining Letters Patent for said invention or improvement for the unexpired part of the fourteen years since obtaining the first Patent. I hereby declare that the following is a full and exact description of the said Chandelier or hanging Lamp as invented or improved by me — The principal object of my improvement is to cause a more perfect and equal diffusion of clear and vivid light as well under as above and around the lamp This is effected by an opening through the body of the Lamp or vessel containing the oil of such form and relation to the location of the wicks as not materially to intercept the radiations of light and by a requisite number of wicks placed in tubes inserted in the upper part of the lamp and by a glass tube placed at a proper height above the upper extremity of the Body of the lamp. By this combination 6431x Mar 23, 1831 light is transmitted in direct rays to any commanding point. and the
air by rarification is made to pass copiously over each side of the several
wicks in close contact with the flame so as to consume the smoke and
render the light white clear and vivid — Although this lamp may
be made in forms somewhat different. yet the best manner of construc-
ting it is the following — First — Let the body of the lamp itself
consist of two shells nearly concentric made of Britania or other proper
metal: each resembling an inverted bowl with an orifice of about three inches
in the bottom more or less according to the size of the lamp. the one placed
on the other with the edges united. this union however on the top of the
lamp should be by a flat surface of about three fourths of an inch in
width. with a bead or raised edge on its sides to prevent the oil from
running over and thereby keeping the body of the Lamp clean. Let
the inner shell be in the form of the inverted frustrum of a cone,
diverging when suspended about forty or forty five degrees from a line
perpendicular to the horizon. Let the outer shell be swelled between the up-
per and lower edges so as to leave sufficient space for from three gills to
a pint of oil. or a greater or less quantity according to the size of the
lamp. The tube or feeder to be placed at or near the top of the lamp.
The lamp above described should be about seven inches in diameter.
Secondly. Let there be two or more flat tubes made of tin or other
suitable material about one inch wide and about four inches in
length inserted into the space between the shells through the flat
surface above described standing at about the same inclination as
the inner shell and extending about three fourths of an inch out of
the lamp, with slits through one side of them to insert a pin or other
pointed instrument in order to raise or depress the wicks to a suitable
elevation — These tubes may best be made a little circular so as to con-
form when inserted with the circular form of the lamp. and may be
either fixed or so applied as to be drawn out. elevated or depressed
at pleasure. — Thirdly: On or near the flat surface above des-
cribed on the top of the lamp. erect three small pillars or standards
of brass or other proper metal on which place a globular glass [illegible]

in common form and so as to raise the same about one half or three fourths of an inch above the top of the lamp. In the pillars make a notch or shoulder on which the glass tube may rest. secure the tube in the common way by a small screw passing through the top of one of the pillars and pressing against the glass the outer edge thereof being turned a little out in the usual form Fourthly. Let the scrolls or hooks be fixed to the outer and lower extremity of the lamp to receive the chains by which it is suspended in common form (the chains being of brass or of cotton [illegible] in common form) Or (which may be still more convenient) these hooks may be fixed to a narrow metallic band so formed as to set the lower edge of the lamp into it. that it may be removed without removing the chains either from the hooks or the place of suspension. where this lamp is suspended in a cotton factory or other situation peculiarly exposed to fire. a plane glass may be placed in the barrel or otherwise under the lamp so as to prevent the danger. the edge of this glass must rest on small knobs or be a little uneven so as to permit the passage of air upwards — A reflector although less necessary than in common lamps may be affixed above this lamp in the usual form and may be made of tin or other polished metal. or of glass mirror — I do not claim as my invention the tubes for the wicks, nor the glass tube nor the opening through the body of the lamp simply. But what I do claim as my invention or improvement is the following combination (viz). the lamp with an opening through the body thereof in such form in relation to the — wicks as not materially to intercept the radiation of light combined with the tubes for the wicks. and with a glass tube placed at a proper distance above the body of such a lamp. so as to cause such a current of air on each side of the wick as to produce a white clear and vivid light and effect a consumption of the smoke. Dated at Meriden this first day of March AD 1834.

Witnesses
Mary A Andrews
Benajah Andrews

William Lawrence

Exd. [illegible]

(1260 Words)

Drawing